United States Patent
Crump et al.

[11] Patent Number: 5,898,843
[45] Date of Patent: Apr. 27, 1999

[54] SYSTEM AND METHOD FOR CONTROLLING DEVICE WHICH IS PRESENT IN MEDIA CONSOLE AND SYSTEM UNIT OF A SPLIT COMPUTER SYSTEM

[75] Inventors: Dwayne T. Crump, deceased, late of Lexington, Ky., by Angela Crump, executor; Marshall A. Dawson, III, Raleigh, N.C.; John M. Landry, Wake Forest, N.C.; Carl L. Mohre, II; Duane E. Norris, both of Raleigh, N.C.; Eric F. Robinson, Raleigh, N.C.

[73] Assignee: International Business Machines Corporation, Armonk, N.Y.

[21] Appl. No.: 08/954,996

[22] Filed: Oct. 8, 1997

[51] Int. Cl.$^6$ .............................. G06F 13/00; G06F 13/14
[52] U.S. Cl. ......................... 395/280; 395/823; 711/112; 360/39
[58] Field of Search ..................... 395/280, 281, 395/287, 823, 856; 711/112; 360/39, 113

[56] References Cited

U.S. PATENT DOCUMENTS

| | | | |
|---|---|---|---|
| 5,016,121 | 5/1991 | Peddle et al. ............................... | 360/39 |
| 5,050,169 | 9/1991 | Monett ...................................... | 371/21.2 |
| 5,113,497 | 5/1992 | Dewa ........................................ | 395/275 |
| 5,128,995 | 7/1992 | Arnold et al. .............................. | 380/4 |
| 5,214,695 | 5/1993 | Arnold et al. .............................. | 380/4 |
| 5,237,690 | 8/1993 | Bealkowski et al. ...................... | 395/700 |
| 5,257,378 | 10/1993 | Sideserf et al. ........................... | 395/700 |
| 5,299,322 | 3/1994 | Arai et al. ................................. | 395/275 |
| 5,418,960 | 5/1995 | Munroe ...................................... | 395/700 |
| 5,428,796 | 6/1995 | Iskiyan et al. ............................ | 395/728 |
| 5,437,039 | 7/1995 | Yuen ......................................... | 395/725 |
| 5,440,740 | 8/1995 | Chen et al. ................................ | 395/650 |
| 5,442,789 | 8/1995 | Baker et al. .............................. | 395/650 |
| 5,457,785 | 10/1995 | Kikinis et al. ............................ | 395/308 |
| 5,497,490 | 3/1996 | Harada et al. ............................ | 395/700 |
| 5,535,415 | 7/1996 | Kondou et al. ........................... | 395/828 |
| 5,535,419 | 7/1996 | O'Brien .................................... | 395/856 |
| 5,535,420 | 7/1996 | Kardach et al. .......................... | 395/868 |
| 5,564,060 | 10/1996 | Mahalingaiah et al. .................. | 395/871 |
| 5,568,649 | 10/1996 | MacDonald et al. ..................... | 395/868 |
| 5,678,023 | 10/1997 | Adams et al. ............................ | 711/112 |

*Primary Examiner*—Gopal C. Ray
*Attorney, Agent, or Firm*—Anthony N. Magistrale

[57] ABSTRACT

Disclosed is a split computer system that includes a first housing coupled to a second housing with a multi-conductor cable. The first housing includes a first direct access storage device (DASD) having an opening for receiving a removable storage medium. The second housing is separate from the first housing and includes a central processing unit (CPU) coupled to a local bus and an expansion bus, a non-volatile storage device coupled to the local bus, a second DASD coupled to the local bus and a power supply. The system further includes first and second DASD controllers coupled to the first and second DASDs respectively. The cable has one end coupled to the first housing and another end coupled to the second housing for electrically connecting devices in the first housing to devices in the second housing. The second housing has a first interface coupled to the expansion bus and the cable. The first housing also includes a second interface coupled to the cable and the first DASD. The system is operative to detect an access to either the first or second DASD controller and disable a current DASD controller and enable the other DASD controller.

26 Claims, 12 Drawing Sheets

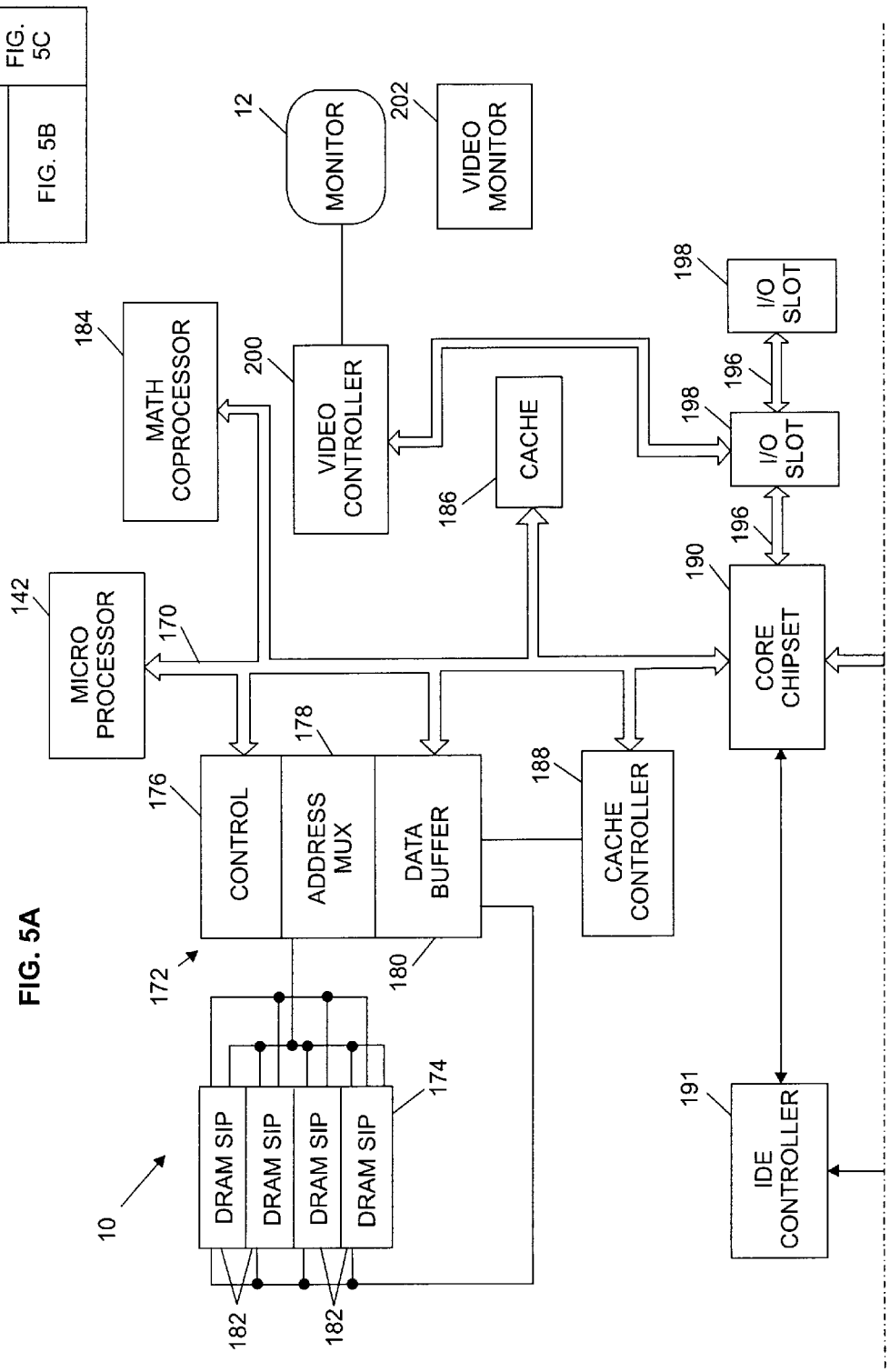

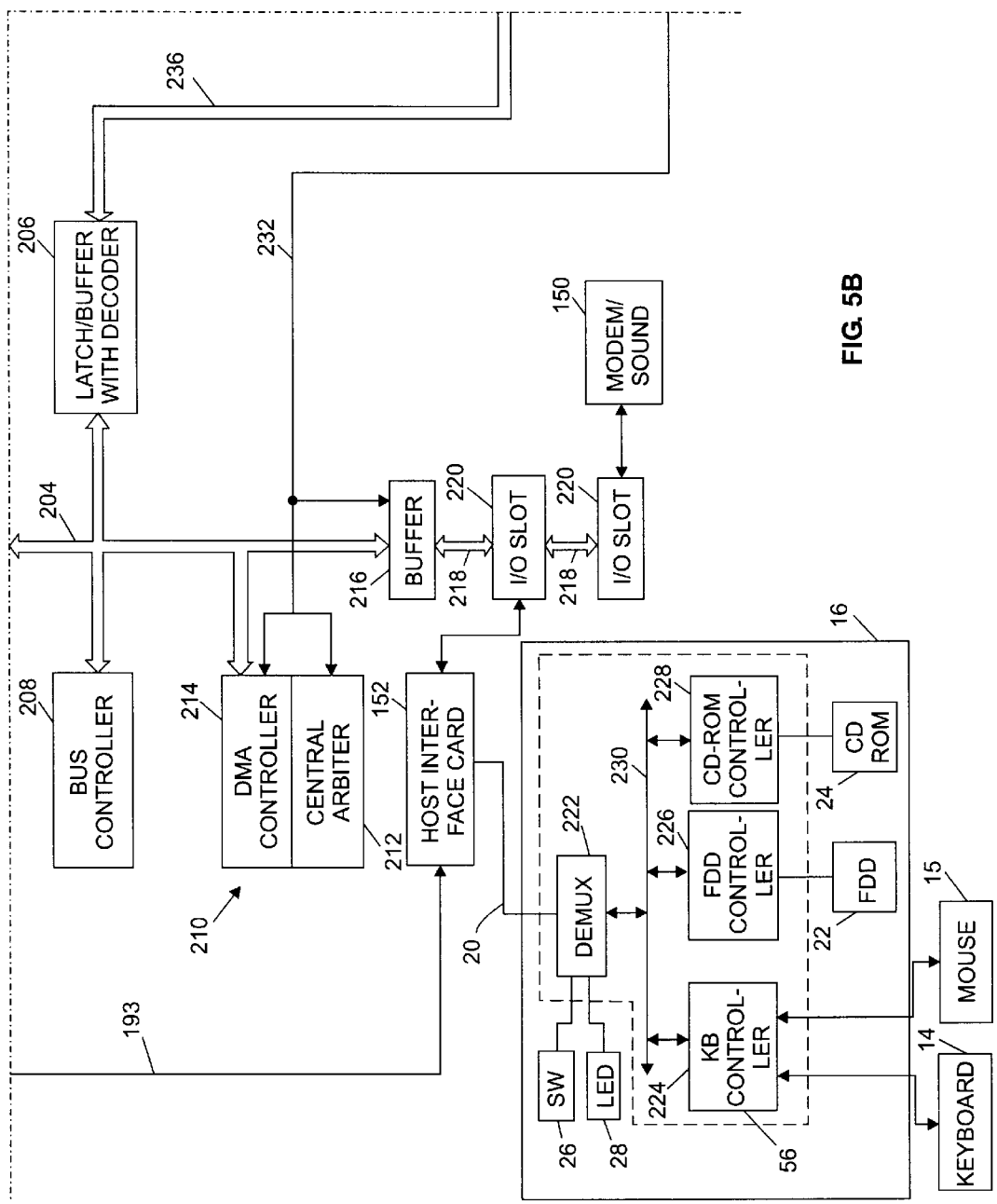

FIG. 8

| n | | | n | | |
|---|---|---|---|---|---|
| 1 | ON_OFF | THIS SIGNAL PARALLELS THE SWITCH BERG (751 PIN 9) | 2 | VOL_UP | DIGIATAL VOLUME UP CONTROL FOR PLANAR AUDIO |
| 3 | P_LED | GREEN LED CONTROL (751 PIN 26) | 4 | VOL_DN | DIGIATAL VOLUME DOWN CONTROL FOR PLANAR AUDIO |
| 5 | AUX5 | AUXILIARY POWER (FROM POWER SUPPLY CONNECTOR) | 6 | GND | |
| 7 | IRQ1 | KEYBOARD INTERRUPT ALL OTHER IRQs NECESSARY ARE AVAILABLE ON THE ISA BUS | 8 | GND | |
| 9 | IDE_LED | HDD INDICATOR DRIVE (FROM LED HEADER) | 10 | SMI_GEN | ALLOWS FOR SMI GENERATION ON FDD IO TRAP FOR MUXING FDD CONTROLLERS AND ON WRITES TO DATA OR CONTROL PORT OF KEYBOARD CONTROLLER 224 |

FIG. 10

| PIN | SIGNAL | PIN | SIGNAL |
|---|---|---|---|
| 1 | DATA15 | 26 | CD_AUDIO_L |
| 2 | DATA14 | 27 | CD_AUDIO_LGND |
| 3 | DATA13 | 28 | CD_AUDIO_R |
| 4 | DATA12 | 29 | CD_AUDIO_RGND |
| 5 | DATA11 | 30 | +12V_DROP |
| 6 | DATA10 | 31 | +12V_DROP |
| 7 | DATA9 | 32 | +12V_DROP |
| 8 | DATA8 | 33 | *12VDC |
| 9 | ADR_EN | 34 | *12VDC |
| 10 | DAT_EN# | 35 | *12VDC |
| 11 | R/W# | 36 | GND |
| 12 | IRQ_STRB# | 37 | GND |
| 13 | TC_BUF | 38 | GND |
| 14 | DRQA# | 39 | GND |
| 15 | DRQB# | 40 | GND |
| 16 | DRQC# | 41 | GND |
| 17 | HDD/IORDY | 42 | GND |
| 18 | DATA7 | 43 | GND |
| 19 | DATA6 | 44 | GND |
| 20 | DATA5 | 45 | GND |
| 21 | DATA4 | 46 | GND |
| 22 | DATA3 | 47 | SPARE |
| 23 | DATA2 | 48 | PWR_LED_ANODE |
| 24 | DATA1 | 49 | AUX5 |
| 25 | DATA0 | 50 | ON_PULSE |

SYSTEM AND METHOD FOR CONTROLLING DEVICE WHICH IS PRESENT IN MEDIA CONSOLE AND SYSTEM UNIT OF A SPLIT COMPUTER SYSTEM

RELATED APPLICATIONS

The present invention is believed to be related to the following pending applications:

Application Ser. No.08/721,651, filed Sep. 23, 1996, and entitled "SPLIT SYSTEM PERSONAL COMPUTER" (further identified as Attorney Docket No. RP9-95-045);

Application Ser. No. 08/721,653, filed Sep. 23, 1996, and entitled "MEDIA CONSOLE FOR A SPLIT SYSTEM PERSONAL COMPUTER" (further identified as Attorney Docket No. RP9-95-046);

Application Ser. No. 08/721,650, filed Sep. 23, 1996, and entitled "MULTI-CONDUCTOR CABLE ARCHITECTURE AND INTERFACE FOR A SPLIT SYSTEM PERSONAL COMPUTER" (further identified as Attorney Docket No. RP9-96-009);

Application Ser. No. 08/717,558, filed Sep. 23, 1996, and entitled "METHOD FOR INTERFACING A MEDIA CONSOLE AND A SYSTEM UNIT" (further identified as Attorney Docket No. RP9-96-014); and Application Ser. No. 08/946,407, filed Oct. 07, 1997, and entitled "LOCAL BUS IDE ARCHITECTURE FOR SPLIT COMPUTER SYSTEM" (further identified as Attorney Docket No. RP9-97-019).

BACKGROUND OF THE INVENTION

1. Field of the Invention

The present invention relates to personal computer systems and more particularly to a split system personal computer which includes a media console containing user interactive components (e.g., floppy disk drive, power switch) coupled to a processing unit having system components (e.g., central processing unit, memory, hard disk drive) via a cable and wherein a system management interrupt (SMI) is used to control devices which exist in both the media console and the processing unit.

2. Description of Related Art

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's Personal Computer AT and IBM's Aptiva.

Historically, a personal computer (PC) was a relatively large box that sat on top of a desk and contained all of the electronics—the processor, memory, IO devices, floppy disk drive, etc. This was known as the system unit and required a significant amount of desktop work space. The monitor was traditionally a cathode ray tube (CRT) that was placed on top of the system unit. The keyboard and (eventually a mouse) was placed in front of the system unit to provide for user input. Accordingly, these "desktop" computer systems combined all PC functions and accessibility in one enclosure on the desktop where significant space is required and noise sources are relatively close to the user. In addition, there was no way to compact the elements when the PC was not in use.

In order to reduce the clutter that a personal computer caused on the desktop, a tower design soon emerged that moved the system unit components into a tower form-factor that sat along-side the desk. The CRT now sat directly on the desk with the keyboard and mouse in front of it. However, this "minitower" type unit is typically placed on the floor where accessibility to drives (floppy and CD-ROM), power, and system activity (LEDs) is compromised and awkward. These two form factors (the "desktop" and "minitower" systems) have endured for quite some time with just various changes in the size, shape and color.

Recently, an additional form factor has been developed. The above related applications describe a split system personal computer form factor that significantly reduces the amount of desktop space needed, reduces noise on the desktop and provides easy accessibility to removable DASD drives. For example, the above related application Ser. No. 08/721,650 describes a computer system that includes a media console coupled to a system unit with a multi-conductor cable. The media console contains at least one direct access storage device (e.g., floppy disk drive). The system unit is separate from the media console and includes a microprocessor, a non-volatile storage device and a system power supply. The multi-conductor cable has one end coupled to the media console and another end coupled to the system unit for electrically connecting devices in the media console to devices in the system unit. The system unit has a first interface coupled to the expansion bus and the cable, and the console has a second interface coupled to the cable and the direct access storage device in the console.

The above split system personal computer can contain a "split device", that is, a device which exists in both the media console and the processor unit, yet appear to be in only one place. For example, in the split system, two floppy disk drives can be installed, one in the media console and the other in the processor unit. Each floppy disk drive has its own controller. To the operating system, however, this appears as if two floppy drives are connected to the same controller.

Conventional non-split systems with two floppy disk drives only have one floppy drive controller. The floppy control register in the single floppy controller is used to select between the first floppy drive and the second floppy drive. Whenever software or BIOS accesses the floppy disk, it first selects the correct drive using the floppy control register.

However, in the above split system, each of the floppy disk drives are connected to separate floppy disk controllers. Accordingly, using the floppy control register on one controller would have no effect on the floppy disk connected to the other controller. In addition, since the processor unit and the media console both have a floppy disk controller, they each take the same resources from the system. As a result, both controllers cannot be turned on at the same time. If they were, the system unit interface and the planar floppy disk controller would both respond to floppy disk accesses causing a conflict.

It is therefore desirable to provide a split computer system which can control devices which exist in both the media console and the processor unit without having to remove or disable any of the devices in the media console.

SUMMARY OF THE INVENTION

One embodiment of the present invention is directed to a personal computer system that includes a first housing coupled to a second housing with an electrical connector. The first housing includes a first direct access storage device (DASD) having an opening for receiving a removable storage medium. The second housing is separate from the first housing and includes a processor coupled to a local bus and an expansion bus, a non-volatile storage device coupled to the local bus, and a second DASD device coupled to the local bus. The system further includes first and second DASD controllers coupled to the first and second DASD devices respectively. The electrical connector has one end coupled to the first housing and another end coupled to the second housing for electrically connecting devices in the first housing to devices in the second housing. The second housing has a first interface coupled to the expansion bus and the electrical connector. The first housing also includes a second interface coupled to the electrical connector and the first DASD device. The system is operative to detect an access to either the first or second DASD controller and disable a current DASD controller and enable the other DASD controller.

The first interface can be further operative to detect the access to the first or second DASD device and generate a system management interrupt (SMI) to the processor. The processor then transfers control to an SMI routine which disables the current DASD controller and enables the other DASD controller.

The first DASD controller can include a first control register settable in one of an enabled state and a disabled state for enabling and disabling the first DASD device. In addition, the second DASD controller can include a second control register settable in one of an enabled state and a disabled state for enabling/disabling the second DASD device.

Another embodiment of the present invention is directed to a computer system which includes a first housing containing a first direct access storage device having an opening for receiving a removable storage medium, and a first keyboard controller. A keyboard is coupled to the first housing and the first keyboard controller. The system further includes a second housing separate from the first housing and having a processor coupled to a local bus and an expansion bus, a non-volatile storage device coupled to the local bus and a second keyboard controller coupled to the expansion bus. An electrical connector has one end coupled to the first housing and another end coupled to the second housing for electrically connecting devices in the first housing to devices in the second housing.

The second housing includes a first interface coupled to the expansion bus and the electrical connector while the first housing has a second interface coupled to the electrical connector and the DASD device. The system is operative to detect when a first or second predetermined signal is generated from the keyboard and transfer control over processing said signal to the second keyboard controller. The first interface is operative to detect the first or second predetermined signal and generate an SMI to the processor allowing it to transfer control to an SMI routine.

BRIEF DESCRIPTION OF THE DRAWINGS

FIGS. 5A, 5B and 5C are a block diagram of certain components of the computer system of FIGS. 1 and 2.

FIG. 8 is a table of each signal of the 10 pin planar connector on the ISA interface card along with its function description.

FIG. 10 is a table of a signal layout of the multi-conductor flexible cable used in accordance with the present invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
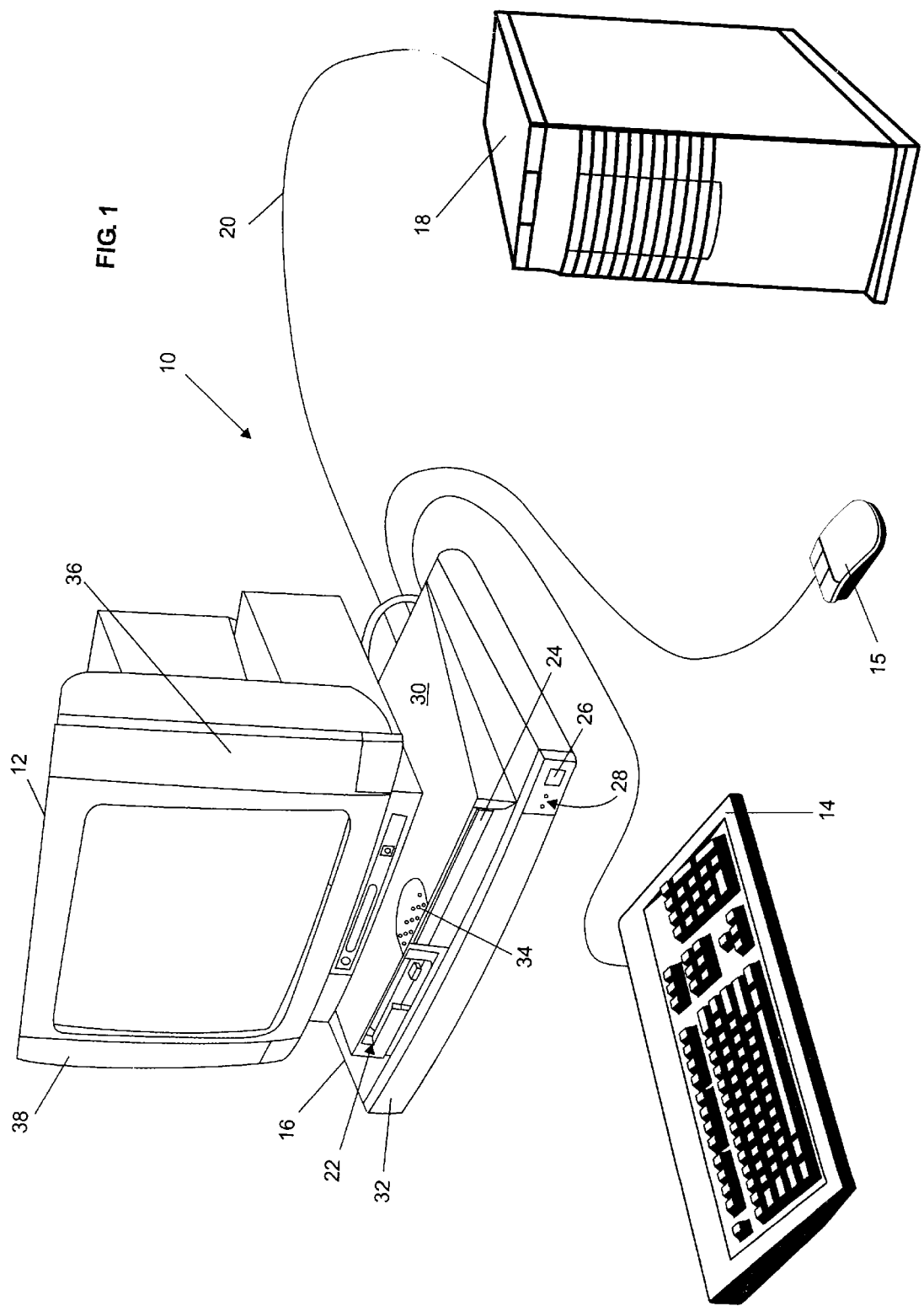
FIG. 1 is a perspective view of a computer system embodying the present invention wherein a drive housing is in an open position.

Referring to the accompanying drawings, a split system personal computer embodying the present invention is there shown and generally indicated at 10 (FIG. 1). The computer system 10 may have an associated monitor 12, keyboard 14, mouse 15 and printer (not shown). The computer 10 includes a media console 16 which is connected to a system or processing unit 18 by a multi-conductor flexible cable 20. The media console 16 can be placed on top of a desk near the monitor 12 and includes all of the user interactive components of the computer system 10 including a floppy disk drive 22, CD-ROM drive 24, power on/off switch 26, status indicators 28 (e.g., power and hard drive activity) and input device ports (e.g., keyboard and mouse). The system unit 18 on the other hand contains all the power, bulky and noisy components that a user does not need to interact with and can be placed under or behind the desk. For example, as will be described in more detail below, the system unit 18 includes a central processing unit (CPU), planar, memory, hard disk drive, expansion bus slots (PCI, ISA), expansion drive bays, power supply, fan(s) and video/graphics subsystem.

Figure 2:
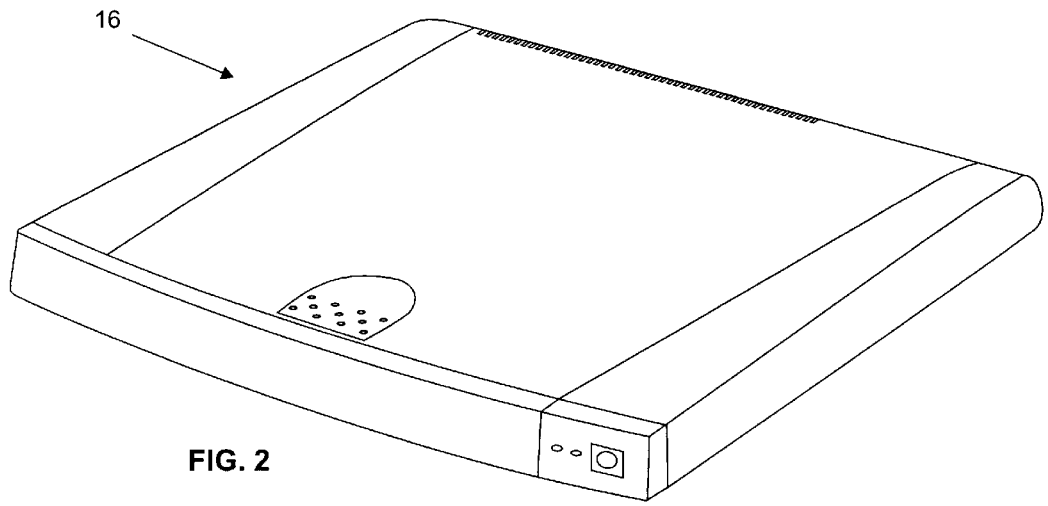
FIG. 2 is a perspective view of the media console of FIG. 1, wherein the drive housing is in a closed position.

The internal mechanical elements allow the drive bay housing 30, which contains the floppy disk drive 22 and CD-ROM drive 24, to move between an open position shown in FIG. 1 and a closed position shown in FIG. 2. In the open position, a user can access the openings in floppy disk drive 22 and/or CD-ROM drive 24 to insert/remove a floppy or compact disk respectively as needed. On the other hand, in the closed position, the openings in FDD 22 and CD-ROM drive 24 are concealed with a front panel of the base member 32 and cannot be accessed. In addition, an optional lock (not shown) can be provided on the media console 16 to lock the drive housing 30 in the closed position providing added security to prevent unauthorized access to the drives 22 and 24.

The internal mechanical assembly allows the drive housing 30 to raise from the console base 32 in one smooth, fluid motion when unlatched and remain supported in the open position (FIG. 1). The drive housing 30 can be raised and unlatched from the closed position (FIG. 2) to the open position (FIG. 1) by a user simply pressing down on the push pad 34, and lowered and latched from the open position to the closed position by a user again pushing down on the push pad 34. This conserves and minimizes space on the desktop, protects the floppy disk drive 22 and CD-ROM drive 24 when in the closed position and also provides easy accessibility of the drives 22 and 24 to the user when needed.

The personal computer system 10 is a split system in that it separates the media components (e.g., floppy disk drive 22 and CD-ROM drive 24) within media console 16 from the central processing unit (CPU), hard drive and power supply which are located within the separate system unit 18. In other words, the computer system 10 removes all the components which a user does not need to interact with away from the desktop work space. As a result, the components which are disposed in the media console 16 on the desktop have a much smaller profile than conventional desktop personal computers. For example, the dimensions of media console 16 when the drive housing 30 is in the closed position can be 55 mm high, 260 mm deep and 390 mm wide as compared to a conventional desktop unit of dimensions 125 mm high, 435 mm deep and 380 mm deep. Yet, unlike the tower design, all user interaction is made easily accessible on the desktop without the need to reach down to a tower unit. In addition, when the computer 10 is not in use, the keyboard 14 may be stored on top of the media console 16 under the monitor 12 to provide an even more compact system. Moreover, the media console 16 is also very low power compared to the processing unit 18 such that it does not produce excessive heat or require a fan.

The monitor 12 can have multimedia speakers 36 and 38 built into opposite sides of the front thereof or the system 10 can have separately detached speakers (not shown) for providing sound. The monitor 12 can be suspended above the media console 16 with a cantilevered monitor stand 40. The monitor stand 40 is self supportive so the monitor weight is not placed on top of the media console 16 and allows the drive housing 30 to raise unimpeded. The stand 40 fits underneath the opposite ends of the media console 16 to keep the monitor 12 within the same "footprint" space as the media console 16. The stand 40 can be formed from standard tubular steel with a steel plate welded to the top for use in interfacing with the monitor's tilt swivel device (not shown).

Figure 3:
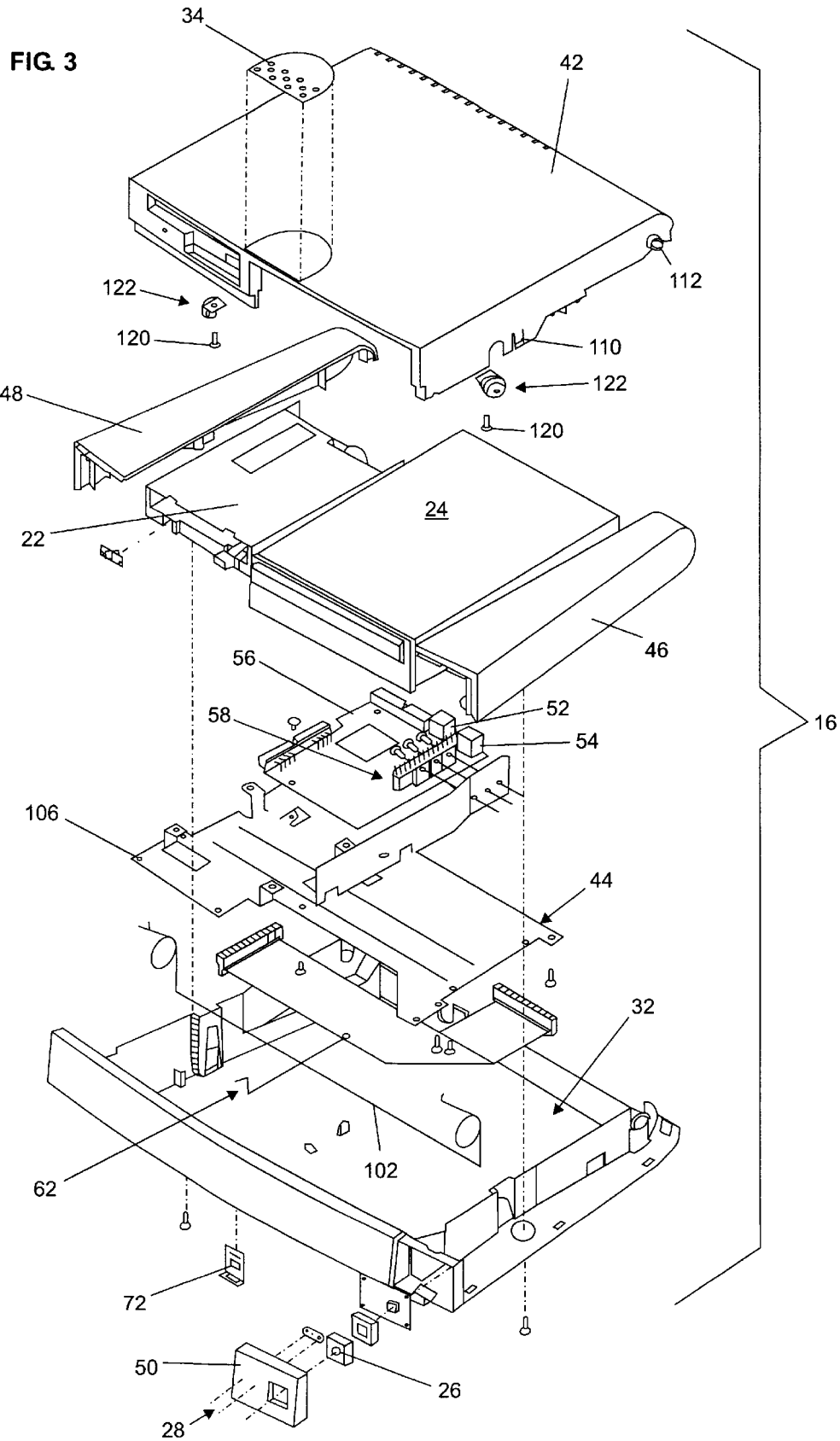
FIG. 3 is an exploded perspective view of certain elements of the media console of FIG. 1 including a base member, drive housing, raise/support mechanism, a latch, electromechanical direct access storage devices and an electronic card, and illustrating certain relationships among those elements.

Referring now to FIG. 3, there is shown a schematic diagram of the elements which make up the media console 16. As shown therein, the media console 16 includes a movable top cover 42 which cooperates with a base member 32 in defining an enclosed, shielded volume for receiving electrically powered data processing and storage components for processing and storing digital data. More specifically, the storage components include floppy disk drive 22 and CD ROM drive 24. The floppy disk drive 22 can be a removable medium direct access storage device (DASD) capable of receiving a diskette inserted there into and using the diskette to receive, store and deliver data as is generally known. The CD-ROM drive 24 can be a removable medium direct access storage device capable of receiving a compact disk inserted there into and using the disk to deliver data as is generally known. Alternatively, either the floppy disk drive 22 or CD-ROM drive 24 could be replaced with a digital video disk (DVD) drive. The FDD 22 and CD-ROM drive 24 are mounted on a direct access storage device bracket 44. The DASD bracket 44 is mounted to the top cover 42 such that the drives 22 and 24 will move with the top cover 42. The top cover 42 includes a user push pad 34 and is disposed between right and left wings 46 and 48 respectively.

User access features and indicators such as a power button 26 and various LEDs 28 (e.g., power light indicator, hard disk drive activity indicator) are included in the media console 16 operator panel 50. A standard keyboard port 52 and mouse port 54 exit the rear of the media console 16. A media console electronics card 56 is disposed within the console housing 30 and is coupled to the floppy disk drive 22 and CD ROM drive 24. The card 56 is also connected to multi-conductor cable 20 via connector 58. As will be described in more detail below, the electronics card 56, in cooperation with an interface in the processing unit 18, is used to receive address and data information from the processing unit 18 and to transfer interrupt state information to the processing unit 18.

Figure 4:
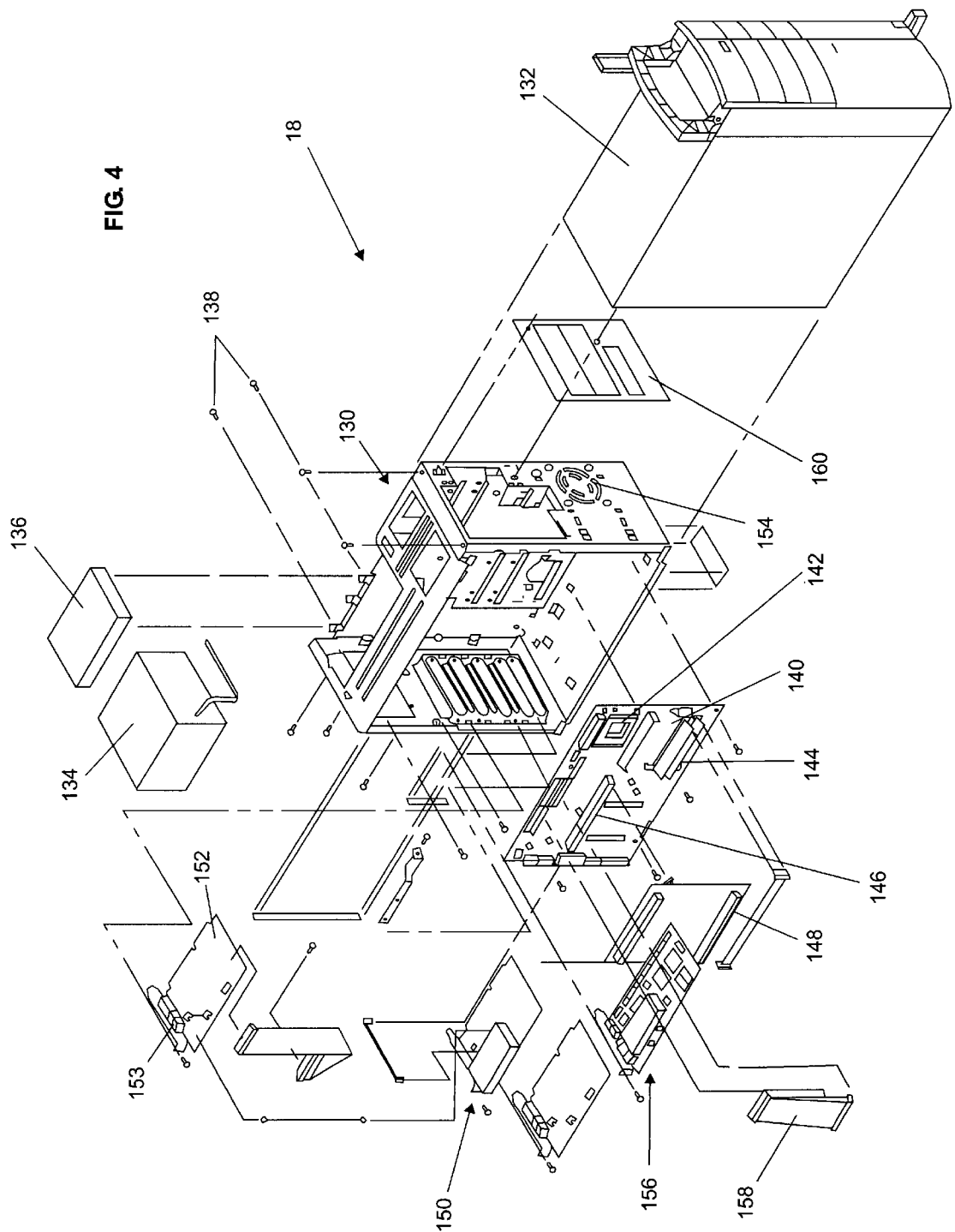
FIG. 4 is an exploded perspective view of certain elements of the processing unit of FIG. 1 including a planar board, CPU, power supply, hard disk drive, ISA interface electronic card and cover, and illustrating certain relationships among those elements.

Referring now to FIG. 4, there is shown a schematic diagram of the tower type system unit 18 of the present invention. As mentioned above, the processing unit 18 is designed to be placed on the floor and contains system components which the user does not need to interact with regularly. More specifically, the system unit 18 contains the remainder of the computer components including a microprocessor, memory, video/graphics subsystem, hard disk drive(s), expansion bus slots (PCI/ISA), expansion drive bays, power supply and fan(s). Accordingly, the processing unit 18 contains all of the high power, bulky and noisy components that the user does not need to interact with. Unless the user chooses to install an accessible drive (like a 5.25" floppy drive or tape backup unit) the processing unit can be completely hidden from view. The multi-conductor electrical cable 20 connecting the processing unit 18 and the media console 16 allows the processing unit 18 to be placed along side, underneath or even behind the desk supporting the media console 16, or in a different room or office than the media console 16.

More specifically, the system unit 18 includes an internal mounting or base chassis assembly 130 disposed within an outer decorative cover 132. Cover 132 has a handle to allow for easy carrying or moving of the tower type processing unit 18. A power supply 134 for supplying power to both the processing unit 18 and the media console 16 is disposed within an upper portion of the assembly 130. A hard disk drive 136 is attached to the top of the assembly 130 by screws 138. The hard disk drive 136 is a fixed medium direct access storage device capable of storing and delivering data as is generally known. A planar 140 is mounted vertically in the right side portion of assembly 130 and includes a central processing unit (CPU) 142, ports 144 for connecting additional RAM memory and a riser card port 146 for connecting a riser card 148. The planar 140 provides a means for electrically interconnecting the components of the computer 10 including those identified above. The system unit 18 also includes a modem/sound card 150 coupled to an expansion bus slot (see FIG. 5B). An expansion bus interface card 152 is disposed within the assembly 130 and is coupled between another expansion bus slot and the multi-conductor cable 20. The interface card 152 will be described in more detail below.

System unit 18 also includes a fan (not shown) disposed behind fan vent 154 for cooling the components of system unit 18 such as the CPU 142, graphics controller, hard disk drive 136 and power supply 134. Since the tower or base unit 18 is meant to be placed under a table or desk, the volume of the enclosure is less critical (1) allowing the fan inside to circulate air inside the unit 18 rather than through it allowing for quieter cooling and (2) allowing the unit 18 to be cooled with optional heat pipes (not shown) that bring the heat to outer surfaces of the box.

A television card 156 is also disposed within processing unit 18 and coupled to an expansion bus slot (FIG. 5A). The TV card 156 allows standard television signals from a coaxial cable or composite video input to be tuned and subsequently displayed in a window on the monitor 12. A 40 pin ribbon cable 158 is used to couple the output of the TV card 156 to the graphics subsystem. An electromagnetic interference (EMI) shield 160 is disposed between the cover 132 and chassis 130.

The processing unit 18 includes other elements which are conventional and as such are not described herein.

Figure 5C:
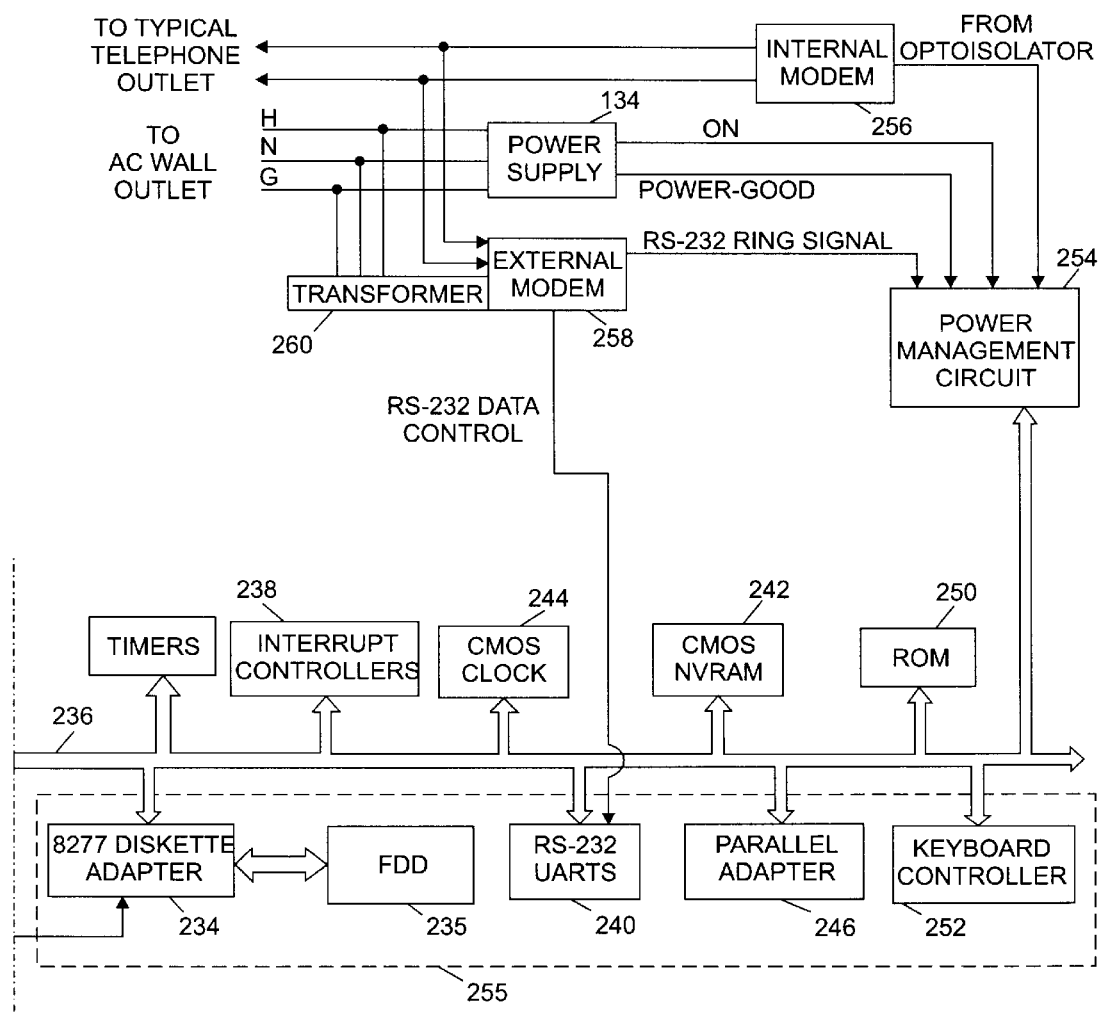

Prior to relating the above structure to the present invention, a summary of the operation in general of the personal computer system 10 may merit review. Referring to FIGS. 5A, 5B and 5C, there is shown a block diagram of a personal computer system illustrating the various components of the computer system such as the system 10 in accordance with the present invention, including components mounted on the planar 140 and the connection of the planar to the I/O slots and other hardware of the personal computer system. Connected to the planar 140 is the system CPU or processor 142 which is connected by a high speed CPU local bus 170 through a memory control unit 172, which is further connected to a volatile random access memory (RAM) 174. The memory control unit 172 is comprised of a memory controller 176, an address multiplexer 178, and a data buffer 180. The memory control unit 172 is further connected to RAM 174 as represented by the four RAM modules 182. The memory controller 176 includes the logic for mapping addresses to and from the microprocessor 142 to particular areas of RAM 174. This logic is used to reclaim RAM previously occupied by basic input output system (BIOS). Further generated by memory controller 176 is a ROM select signal (ROMSEL), that is used to enable or disable ROM.

While the present invention is described hereinafter with particular reference to the system block diagram of FIGS. 5A, 5B and 5C, it is to be understood at the outset of the description which follows that it is contemplated that the apparatus and methods in accordance with the present invention may be used with other hardware configurations of the planar board. For example, the system processor 142 could be an Intel Pentium processor, Cyrix 586-P75 processor or Advanced Micro Devices 8486 processor or any other microprocessor that has a system management interrupt (SMI).

Returning now to FIGS. 5A, 5B and 5C, the CPU local bus 170 (comprising data, address and control components, not shown) provides for the connection of the microprocessor 142, a math coprocessor 184 (if not internal to the CPU 142), a system cache memory 186, and a cache controller 188. Also coupled on the CPU local bus 170 is a core chipset 190 and a bridge chip 191 which includes a peripheral component interconnect (PCI) bridge and an integrated drive electronics (IDE) controller. The core chipset 190 can be an Intel 430VX chip and the bridge chip 191 can be an Intel PIIX3 chip. The PCI bridge within chip 191 provides an interface between the local bus 170 and a PCI bus 196. Connected to the PCI bus 196 are a plurality of I/O slots 198 for receiving peripheral devices, one of which is a video controller 200. The video controller 200 has associated with it a monitor (or video display terminal) 12 and a video memory 202.

The IDE controller in chip 191 provides for the attachment of IDE compatible storage devices such as the fixed disk drive 136 and CD-ROM drive 24. The IDE controller 191 is coupled to the host interface card 152 via an IDE bus 193.

The chipset 190 is itself connected to a slower speed (compared to the CPU local bus 170) system bus 204, also comprising address, data and control components. The system bus 204 extends between the chipset 190 and a buffer 206. The system bus 204 is further connected to a bus control and timing unit 208 and a DMA unit 210. The DMA unit 210 is comprised of a central arbiter 212 and a DMA controller 214. An additional buffer 216 provides an interface between the system bus 204 and an optional feature or expansion bus 218 such as the Industry Standard Architecture (ISA) bus. Connected to the bus 218 are a plurality of I/O slots 220 for receiving ISA adapter cards, one of which is a host interface ISA card 152 (another of which is the modem/sound card 150). Additional ISA adapter cards can be pluggably connected to the I/O slots 220 and may provide additional I/O devices or memory for the system 10.

The host card 152 is connected by the multi-conductor cable 20 to the electronic card 56 which is disposed in the media console 16. The host card 152, cable 20 and console electronics card 56 will be described in more detail below. It is sufficient at this point to note that the electronics card 56 includes a de-multiplexer 222 which is coupled to a keyboard controller 224, an 8277 (or compatible) diskette adapter 226 and a second IDE controller 228 via bus 230. The keyboard controller 224 is the slave processor that interfaces with the keyboard 14 and the mouse 15. The de-multiplexer 222 is also coupled to the power switch 26 and the power/feedback LED 28. The keyboard controller 224, FDD controller 226 and IDE controller 228 can all be included in a single super I/O circuit 286 (FIG. 6) such as for example, a SMC37C932 chip.

An arbitration control bus 232 couples the DMA controller 214 and central arbiter 212 to the I/O slots 220 and another diskette adapter 234.

While the microcomputer system 10 is shown with a basic 8 megabyte RAM module 174, it is understood that additional memory can be interconnected as represented in FIGS. 5A, 5B and 5C by the addition of optional higher-density memory modules 182. For purposes of illustration only, the present invention is described with reference to the basic eight megabyte memory module.

A latch buffer and decoder 206 is coupled between the system bus 204 and a planar I/O bus 236. The planar I/O bus 236 includes address, data, and control components respectively. Coupled along the planar I/O bus 236 are a variety of I/O adapters and other components such as the diskette adapter 234 coupled to floppy disk drive (FDD) 235, an interrupt controller 238, an RS-232 adapter 240, nonvolatile CMOS RAM 242, also herein referred to as NVRAM 242, a CMOS real-time clock (RTC) 244, a parallel adapter 246, a plurality of timers 248, the read only memory (ROM) 250, the keyboard controller 252, and the power management circuitry 254. The keyboard controller 252, FDD controller 234, FDD 235, RS-232 adapter and parallel adapter 246 can all be included in a single super I/O circuit 255. The keyboard controller 252 and diskette adapter 234 are duplicated in the media console 16 in order to allow additional diskette drives or tape drives to be installed in the system unit 18 (via 234), or the keyboard and mouse can be plugged into the system unit 18 instead of the console 16 (via 252). In addition, the duplication allows the same planar to be used without such a console 16. The power management circuitry 254 is in circuit communication with the power supply 134, the switch 26, the power/feedback LED 28, and an internal modem 256 and/or an external modem 258. The external modem 258 is typically connected to a transformer 260, which is connected to a typical wall outlet, as is known to those skilled in the art. The modems 256, 258 are connected to a typical telephone outlet.

The read only memory 250 includes the BIOS that is used to interface between the I/O devices and the operating system of the microprocessor 142. BIOS stored in ROM 250 can be copied into RAM 174 to decrease the execution time of BIOS. ROM 250 is further responsive (via ROMSEL signal) to memory controller 176. If ROM 250 is enabled by memory controller 176, BIOS is executed out of ROM 250. If ROM 250 is disabled by memory controller 176, ROM is not responsive to address inquiries from the microprocessor 142 (i.e. BIOS is executed out of RAM).

The real-time clock 244 is used for time of day calculations and the NVRAM 242 is used to store system configuration data. That is, the NVRAM 242 will contain values which describe the present configuration of the system 10. For example, NVRAM 242 contains information describing the capacity of a fixed disk or diskette, the type of display, the amount of memory, time, date, etc. Furthermore, these data are stored in NVRAM 242 whenever a special configuration program, such as SET Configuration, is executed. The purpose of the SET Configuration program is to store values characterizing the configuration of the system to NVRAM 242.

The interface card 152, multi-conductor cable 20 and media electronics card 56 will now be described with reference to FIGS. 6–10. The ISA interface card 152 allows IDE controller 228, FDD controller 226 and 8042 keyboard controller 224 to be used in the media console 16. The ISA card 152 which is plugged into the base system unit 18 can be programmed to decode certain ranges of I/O addresses. The BIOS ensures that the proper I/O ranges for the devices in the console 16 ("split" devices) are enabled and that possibly conflicting planar devices are disabled. When the interface card 152 detects a valid input/output (I/O) or direct memory access (DMA) cycle for a split device, it intercepts the cycle and issues the I/O (or DMA) cycle to the media console 16 electronics card 56 which responds to the I/O (or DMA) cycle.

A multiplexing scheme was developed to multiplex address, data, and interrupts in order to keep the number of signals in the cable 20 to a reasonable number. In addition to the multiplexed I/O signals, some other signals had to be brought up independently—auxiliary 5 volts, the power light indicator signal, and the power switch signal. These signals must be separate because they must be active even when the main power is off.

The present invention provides a generic ISA bus I/O extender interface that minimizes the number of signals needed to transfer data, address and interrupts between devices in the console 16 and devices in the system unit 18. In addition, the present invention allows the media console 16 electronics to be based around a super I/O device 286 that contains the IDE, FDD and keyboard controllers 228, 226 and 224 respectively. In addition, new devices could easily be added simply by adding the appropriate decode range to the base card and adding the ISA device to the media console 16 with no changes to the cable 20 protocol.

Figure 6:
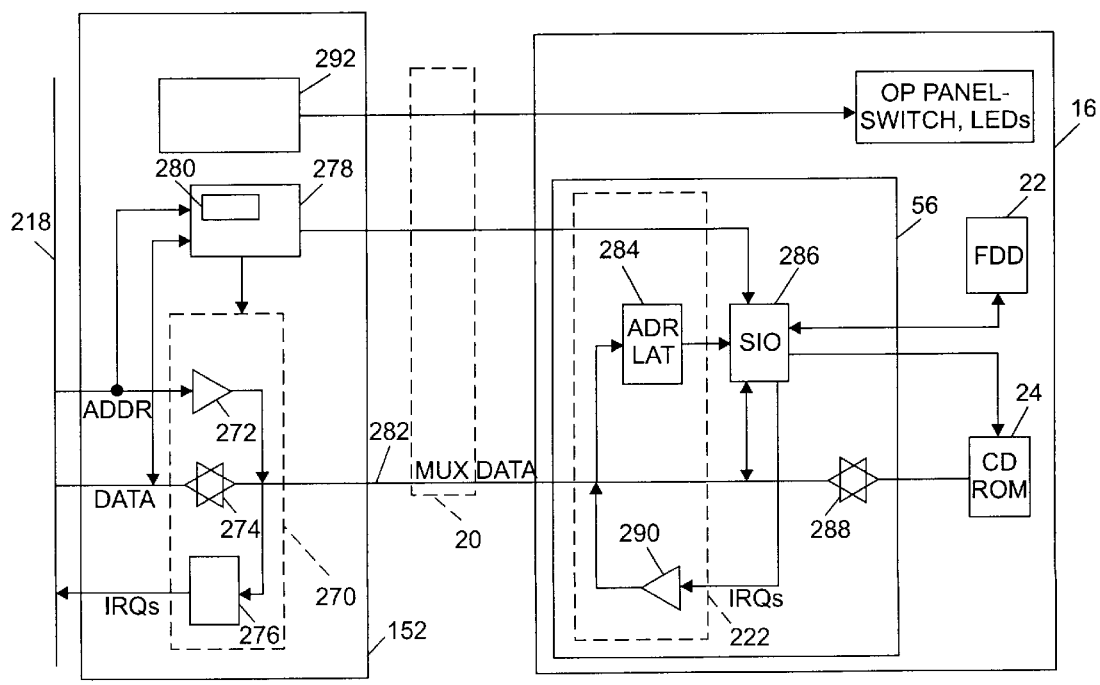
FIG. 6 is a schematic block diagram of the ISA interface electronic card, cable and media console electronic card of the present invention.

Referring now to FIG. 6, there is shown a schematic diagram of the ISA interface card 152, the media card 56 and the coupling therebetween via the multiconductor cable 20. The interface card 152 includes a multiplexer 270 for multiplexing addresses from the ISA bus 218, data to/from the ISA bus 218 and interrupt requests (IRQs) from the console 16 to the ISA bus 218. Multiplexer 270 includes a tristateable address driver 272 coupled to the address signals of ISA bus 218, a tristateable transceiver 274 coupled to the data signals of ISA bus 218 and an IRQ latch 276 coupled to the control portion of ISA bus 218. A sequencer or control circuit 278 is coupled to the address and data signals of the ISA bus 218 and multiplexer 270. Configuration registers 280 are used by BIOS to enable the appropriate I/O address ranges and DMA channels for the sequencer 278 to pass through to the media console 16. A description of the registers 280 and an unlocking/locking sequence is described below.

The sequencer 278 constantly monitors the ISA bus 218 waiting for I/O or DMA cycles that it must act upon. During ISA bus idle times, the address signals are constantly driven through the multi-conductor cable 20 to the media console 16. When the sequencer 278 detects an I/O cycle that needs to be passed through to the media console 16, the address enable signal (ADR_EN) is deasserted to latch the address into the media console 16 and tristate the cable data bus 282 (MUX DATA). Next, the data enable (DAT_EN#) is asserted to enable the data transceivers to pass the data to/from the media console 16 across the multi-conductor cable data bus 282.

At the end of each I/O and DMA cycle (even those not decoded) as well as memory refresh cycles, the sequencer 278 samples the 8 IRQ signals that the media console 16 is capable of generating (IRQs 1, 3, 6, 9, 11, 12 14 and 15). The media console 16 was designed to only generate 8 IRQs and allow a single byte to be transmitted. It should be understood that the media console 16 could be designed to generate 16 IRQs but this would increase cost. The 8 IRQs chosen are typical ones used by the devices in the console 16 (e.g., IRQ1 for the keyboard 14, IRQ6 for the floppy disk drive 22, IRQ 12 for the mouse 15 and IRQ15 for the CD-ROM drive 24. Extra IRQs (IRQs 3, 9, 11 and 14) are included to allow a Plug-n-Play operating system to reconfigure the IRQs. The sequencer 278 activates the IRQ strobe signal (IRQ_STRB#) for one clock cycle. In response to this signal, the media console 16 drives the current state of the interrupts onto the cable data bus 282. The IRQ latch 276 then latches the interrupt states and drives them onto the ISA channel with open collector drivers. This IRQ cycle overlaps the ISA bus I/O recovery time so that there is no performance penalty. No interrupts are lost since all devices generate interrupts in a level triggered fashion. An interrupt never occurs as a short pulse as they are always latched by the generating device and it requires action by the CPU 142 (usually reading a status I/O port) to clear the IRQ.

The electronics card 56 in the media console 16 is an I/O bus demultiplexer. The demultiplexer 222 includes an address latch 284 for latching the addresses from the base card 152. A super I/O device (SIO) (e.g., SMC 37C932) 286 is coupled to the address latch 284, the FDD 22, the CD-ROM 24, the sequencer 278, the tristateable transceiver 288 and the IRQ tristateable buffer 290. As noted above, the SIO device 286 contains the diskette adapter 226 and IDE disk controller 228 for the floppy disk drive 22 and CD-ROM drive 24 respectively. The demultiplexer 222 is a slave to the sequencer 278 in the base card 152. More specifically, the demultiplexer 222 responds to the address enable (ADR_EN) and data enable (DAT_EN#) signals generated by the sequencer 278 and the IRQ strobe (IRQ_STRB#) signal also generated by the sequencer 278 to latch/drive the appropriate signal groups.

The output of the demultiplexer 222 is a pseudo ISA bus in that it does not support all I/O addresses, memory cycles, master cycle etc. but rather only carries certain I/O address ranges. In addition, this pseudo ISA bus only carries up to 3 DMA channels and 8 IRQ signals. One DMA channel (channel 2) is used for the floppy disk drive 22 and the other two channels are spares. The 3 DMA channels and 8 IRQs were chosen to be sufficient for the devices currently in the console 16 and allow upgrades as well with the unused DMA channels and IRQs. Of course, more DMA channels and IRQs would require more conductors in the cable 20. The setup and hold timings for the pseudo ISA bus are slightly more stringent than the ISA bus 218. The timing restrictions are due to the additional propagation delays through the buffers and cable 20. The super I/O integrated circuits available today have much less setup and hold specifications than the original ISA bus allowed for. This allows the split system 10 of the present invention to operate with no additional wait states.

The host interface card 152 is configured to pass the appropriate I/O addresses through to the media console 16. In addition, the console 16 is programmed to respond to the appropriate addresses as well. It should be noted that interrupt request levels do not need to be programmed as they are automatically passed through from the media console as they are generated. This is possible because they are driven back to the ISA bus 218 using open collector drivers (i.e., output of IRQ latch 276).

The sequencer 278 is configured through a pair of 8 bit I/O ports or registers 280 within sequencer 278; a first I/O port (CFG_ADDR) at address 370H and a second I/O port (CFG_DATA) at address 371H. The CFG_ADDR register is a write only register which is used to open and close the configuration space and to select one of the configuration registers. Bits 0–3 of this register are Index bits and bits 4–7 are unused. The CFG_DATA register is a read/write register used to access the configuration register currently specified by CFG_ADDR. Bits 0–3 of this register are used for data and bits 4–7 are unused.

The configuration registers are unlocked by writing the following sequence to the CFG_ADDR register: "0DH", "0CH". The logic within sequencer 278 enters the first stage of the unlock sequence after the "0DH" is received. It is important that the "0CH" be received immediately afterwards because any other output cycle (even to another I/O port) will reset the lock. Once unlocked, the configuration registers 280 can be accessed until the locking key ("0FH") is received. Also when the configuration is unlocked, any configured decodes are disabled.

The following configuration registers 280 are used to select the appropriate I/O and DMA cycles to route through to the media console 16:

| | | |
|---|---|---|
| IDE_MISC | index 0 | Default = 0 |
| | Bit 1..0 | 00 - Enable no IDE |
| | | 01 - Enable IDE1: 1F0H-1F7H, 3F6H |
| | | 10 - Enable IDE2: 170H-177H, 376H |
| | | 11 - Enable IDE3: 1E0H-1E7H, 3E6H |
| | Bit 2 | Enable programmed I/O ranges. "0" means computer system is off. |
| FDD_DCD | index 1 | Default = 0 |
| | Bit 0 | Enable FDD1: 3F0H-3F7H |
| | Bit 1 | Enable FDD2: 370H-377H |
| | Bit 2 | Enable SMI generation on write to FDD control port. This bit is cleared when the SMI occurs. This bit also enables shadow writes to the FDD1 address range even when bit 0=0. |
| DMA_ACK | index 2 | Default = 0 |
| | Bit 1..0 | 00 - Enable no DACK cycles |
| | | 01 - Enable DACK0 cycles |
| | | 10 - Enable DACK1 cycles |
| | | 11 - Enable DACK2 cycles |
| | Bit 2 | Enable all I/O address ranges (use for configuration only). |
| KBM_DCD | index 3 | Default = 0 |
| | Bit 0 | Enable 8042 I/O address ranges. This bit also automatically enables SMIs for CPU reset/A20 emulation (SMI occurs for writes of X1, XC, XD, XE, XF to port 64H (control port of keyboard controller 224)). This bit is cleared when the SMI occurs. Enable SMIs on writes to port 60H (data port of |
| | Bit 1 | keyboard controller 224). This bit is cleared when the SMI occurs. |

Figure 7:
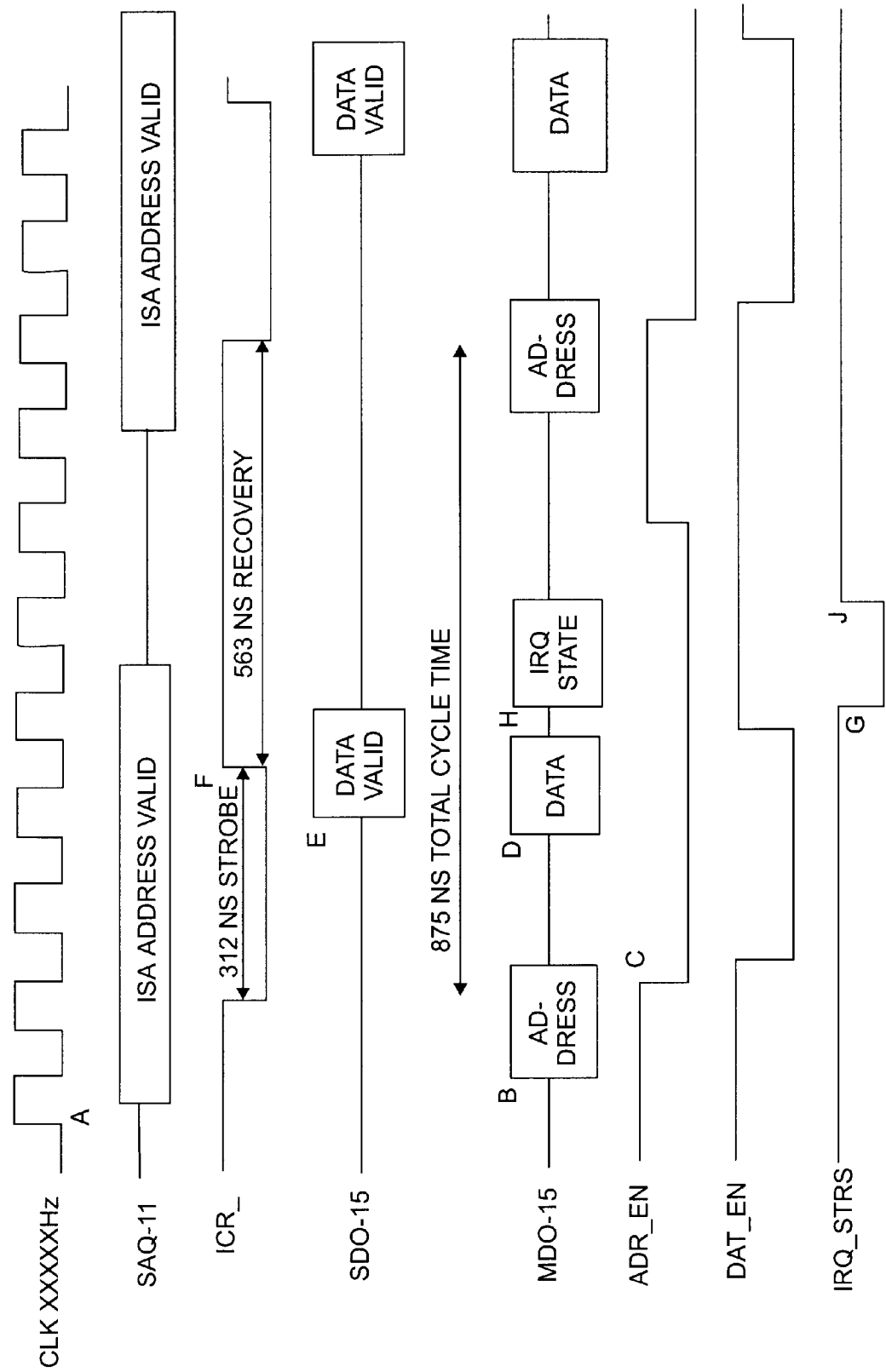
FIG. 7 is a cycle timing diagram of a block read I/O cycle between the ISA interface in the system unit and the CD-ROM drive of the media console via the connecting electrical cable.

Turning now to FIG. 7, there is shown a cycle timing diagram of a 16 bit I/O cycle through the ISA interface of the present invention. The cycle timing is characteristic of a block read of data from the CD ROM 24. More specifically, a device in system unit 18 generates an ISA address at A. The sequencer 278 detects that this is an ISA address directed to the media console 16. As stated above, the sequencer 278, during bus idle times constantly drives the address signals through the cable 20 to the media console 16. Accordingly, at point B the multiplexer 270 provides the ISA address to the media console electronics card 56 via the cable 20. At C the sequencer 278 deasserts the ADR_EN to latch the address into the media console 16 and tristate the cable data bus. Next, the demultiplexer 222 switches to provide data on its output at D, the data is then transferred to ISA bus 218 at E, and the device requesting the data then latches the data at point F. The I/O read cycle also ends at F when the requesting device driving the ISA bus 218 deasserts the IOR_ signal. The sequencer 278 then activates IRQ_STRB# for one cycle at G. In response thereto the media console electronics card 56 drives the current state of the interrupts onto the cable data bus at H. The IRQ states are latched into IRQ latch 276 at point J.

As shown in FIG. 7, the I/O read cycle takes 312 nsec and the recovery takes 563 nsec to yield a total cycle time of 875 nsec for a 16 bit IO read. This yields a maximum sustained transfer rate of 2.3 MB/sec.

The main connection between the host interface 152 and the planar 140 is the ISA bus 218 itself. All ISA bus signals used are buffered appropriately so that the multi-conductor cable 20 and media console 16 do not adversely affect the ISA bus loading. There are a few other signals that must be picked up from sources other than the ISA bus 218. As noted above, these signals include AUX5, the power light indicator signal and the power switch signal. There is also an SMI_GEN signal which is used to generate an SMI from the host interface card 152 (described in more detail below). The red book audio interface from the CD-ROM 24 is included in the cable 20 and made available on the host interface card 152. The connector has been chosen such that the same cable that is currently used to connect the CD and sound card can be used between the host interface card 152 and sound card. Various other signals are required from the planar. Many of these are available through existing planar connections. However, to reduce the number of discrete jumper cables required and ease assembly of the system unit 18, all necessary signals have been incorporated into a single 10 pin (2×5) connector on the planar 140 which is connected to planar connector 292 on the ISA card 152. Each of the signals of the 10 pin connector along with its function description is shown in the table of FIG. 8.

Figure 9:
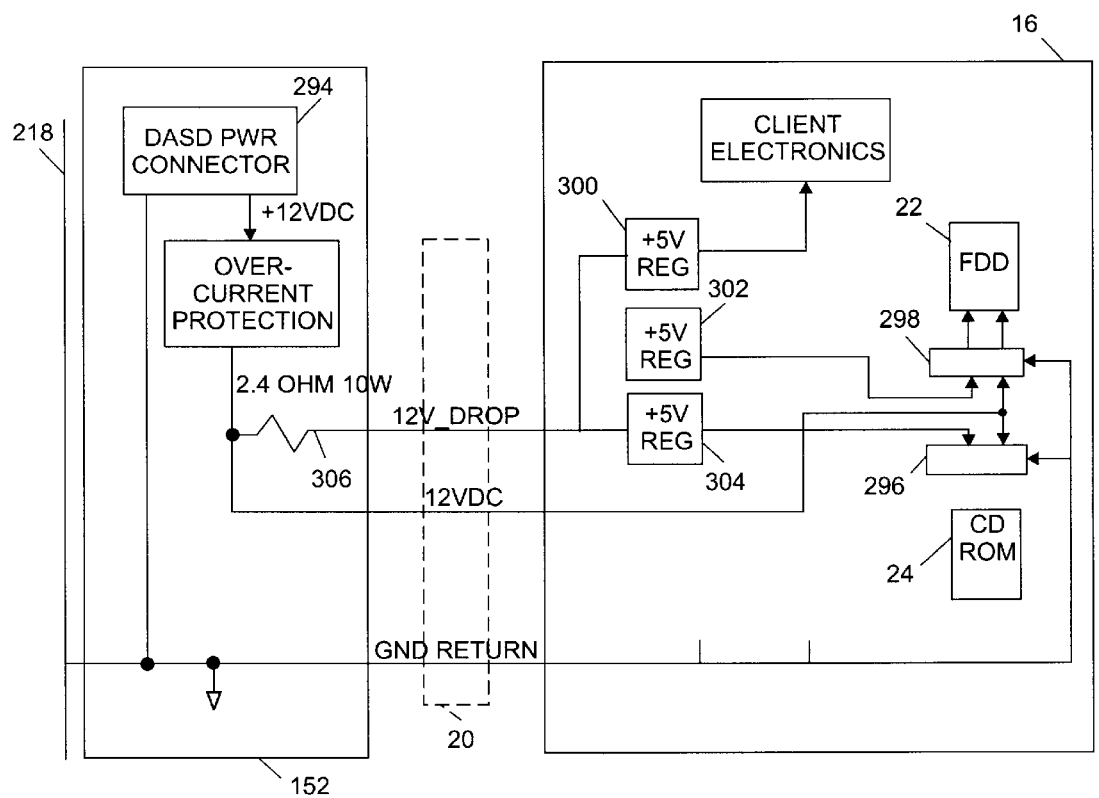
FIG. 9 is a schematic diagram of the power distribution between the ISA interface card and media console electronics card of the present invention.

Turning now to FIG. 9, there is shown a power distribution between the host interface card 152 and media electronics card 56 of the present invention. Since the media console 16 is powered through the multi-conductor cable 20, the necessary voltage (+12V DC) is obtained by using one of the large DASD connectors 294 from the power supply. This avoids the potential problem of pulling too much current through the ISA edge connector. The number of available DASD connectors should not be an issue because the CD-ROM 24 is not located in the base unit 18 of the split system 10. The power voltages that exit the system through the multi-conductor cable 20 connector go through a 2.5 amp resettable fuse to prevent cable or circuit damage in the event of a short.

Bulk +12V is provided to the media console 16 from cable 20. This is used to provide power to the CD-ROM and floppy disk drive DASD connectors 296, and 298 respectively. (It should be noted that +12V is still available in the DASD connector 298 to the floppy disk drive 22 even though current FDD's typically do not use +12V motors.) There is also a current limited +12V DC bulk voltage that is used to regulate down to +5V DC. In order to handle the current requirement of each component of the media console 16, 3 independent regulators are implemented. One regulator 300, is for the 5V DC supply to the electronics (including keyboard and mouse), another regulator 302 is for the 5V DC to the floppy disk drive power connector 298 and a third regulator 304 is for the 5V DC for the CD-ROM power connector 296. The current to all three regulators is limited by a voltage dropping resistor 306. This resistor has been chosen to be a 2.4 ohm 10 watt resistor. Therefore the three regulators can supply a total of about 2 amps of current before dropping out of regulation. The regulators are attached to a sufficient heat sink to prevent overheating. The dropping resistor 306 is physically located on the host card 152 in the processing unit 18 so that the total heat dissipation would not be concentrated in the media console 16 where there is no fan. This means that there are two bundles of power conductors in the multi-conductor cable: +12V DC and +12V_DROP.

The multi-conductor cable 20 is a 28 gauge, 50 conductor cable composed of 25 pairs with a 50 pin Centronics connector on one end (SCSI) which connects to the Centronics connector 153 on host card 152 and a 50 pin header connector on the other end which connects to a connector port 58 on media console 16. The table in FIG. 10 shows the signal layout of the header. The cable 20 can be in a range of between 4 and 7 feet long with 6½ feet being the preferred length. The cable 20 allows the processing unit 18 to be placed along side, underneath or even behind the desk supporting the media console 16, or in a different room or office from the media console 16.

Another embodiment of the present invention relates to the power on self test (POST) and basic input output system (BIOS) used to support the split system 10. The POST of the present invention can detect the presence of the media console 16. Since the POST and BIOS are capable of running on both a traditional system and split system 10, the POST must know whether or not it needs to configure the host interface card 152 and the media console 16. The POST can automatically detect the presence of the media console 16 and the host interface 152 thereby notifying a user quickly of failures in the interface card 152 or media card 56. The user also has the added benefit of using the system 10 in the traditional manner by disconnecting the host interface without having to re-configure the system 10.

POST detects the host interface card 152 by first unlocking the configuration space as described above. Next, a "04H" (I/O Enable) is written to the IDE_MISC configuration register 280 on the interface card 152. POST then reads the IDE_MISC configuration register back and compares it with the "04H" that was written. If the values are the same then POST knows that the interface card 152 is present. If the values are different, then POST know that the interface card 152 is not present.

The media console 16 is detected by POST by checking for the SIO chip 286 located in the console 16. First, POST enables I/O accesses to the SIO chip 286 in the media console 16. This is done by POST unlocking the configuration space of the host interface card 152 as described above. A "04H" (SIO Access Enable) is written to the DMA_ACK configuration register. POST then locks the configuration space of the host interface card 152 back as described above. Second, POST puts the SIO chip 286 into configuration mode and reads the SIO device ID register. If the value read matches the known value of the device ID then the media console 16 is present. On the other hand, if the value read does not match, then POST knows that the media console 16 is not present.

POST is also operative to detect and configure the devices located in the media console 16. This includes the keyboard 14, mouse 16, CD-ROM drive 24 and FDD 226. To detect these devices, POST disables the similar device (e.g., keyboard (not shown), CD-ROM drive (not shown), FDD 235) located on the planar 140. This ensures that POST will not detect the device located on the planar 140. POST then enables the I/O address range for the device in the host interface 152. Using the same algorithm that is used to detect the device on the planar 140, POST determines if the device is present.

All detection is done after POST has determined that the host interface card 152 and media console 16 are present. After detecting the devices, POST must then make sure that the device is configured properly and that the similar device or controller on the planar 140 is disabled. Since some devices, such as the keyboard 14 and mouse 15 can be attached to either the media console 16 or the planar 140, POST must take care to ensure that the proper controllers are configured correctly.

Special consideration is given to configuring the CD-ROM and floppy disk drives. For the CD-ROM drive 24, the address assigned to the IDE controller 228 for the CD-ROM 24 is based upon the other IDE devices (e.g., hard disk drive 136) present in the system 10. Since the CD-ROM 24 in the media console 16 cannot be located on the primary IDE channel, POST must only consider the secondary and tertiary IDE channels. If other IDE devices are present on the planar's secondary IDE channel, the CD-ROM 24 must be located on the tertiary IDE channel and the host interface 152 configured to pass through addresses associated with the tertiary IDE channel. On the other hand, if no other IDE device is present on the secondary IDE channel, the host interface is configured to pass through addresses for the secondary IDE channel and the secondary IDE channel on the planar 140 is disabled.

The floppy disk drives 22, 235 and controllers 226, 234 present other configuration considerations. Because floppy disk controllers do not have separate channels, like the IDE interface, special actions must be taken to allow for multiple diskette drives. One diskette drive 22 can be connected in the media console 16, and a secondary diskette drive 235 could be attached in the processor unit 18. In this case, POST must now be able to handle two floppy disk controllers using the same resources at the same time. POST can detect the presence of each of the diskettes drives 22, 235 by enabling and disabling each diskette controller 226, 234 respectively, one at a time. If POST detects that both diskette drives 22, 235 are present, it sets a bit (bit 2) in the FDD_DCD configuration register to enable SMI generation by host interface card 152 on a write to FDD control port of either floppy disk controller 226, 234. This bit is cleared by the control logic 278 when the SMI occurs to prevent the SMI handler from causing multiple SMIs when switching floppy disk controllers 226, 234. The SMI handler will set the bit on exit. The method for controlling both diskette drives 22 and 235 will be described below.

After detecting the presence of the media console 16, the host interface 152, and all devices attached to the media console 16, POST and BIOS must report the proper information to the configuration managers in both the BIOS and the operating system. POST and BIOS are responsible for configuring Plug and Play (PnP) boot devices such as, for example, SCSI hard drives and RIPL network cards. To do this, POST must have the correct information about which resources in the system are currently in use. More importantly, BIOS must report the resources to a Plug and Play operating system. The BIOS is capable of determining which resources are used based on the presence of the media console 16 and the devices attached to it, and reporting those resources through the Plug and Play BIOS interface. All this is done in a manner such that the PnP operating system has no knowledge that the media console 16 is not a part of the planar 140 itself.

As noted above, a split device is a device which exists in both the media console 16 and the processor unit 18 (e.g., floppy disk controllers 226 and 234), yet appears to be in only one place. In the split system 10, two floppy disk drives 22 and 235 can be installed, one in the media console 16 and the other in the processor unit 18. Each floppy disk drive 22, 235 has its own controller 226 and 234 respectively. To the operating system, however, this appears as if two floppy drives are connected to the same controller.

Since the processor unit 18 and the media console 16 both have a floppy diskette controller 234, 226 respectively, they each take the same resources from the system 10. Because of this, both controllers cannot be turned on at the same time. If they were, the host interface 152 and the planar diskette controller 234 would both respond to floppy disk accesses causing a conflict.

To resolve this problem, the BIOS uses the CPU's system management interrupt (SMI) to switch between the two diskette controllers 226 and 234. As noted above, the CPU 142 has an SMI. Briefly, an SMI allows the CPU 142 to be interrupted at which point an SMI handler routine will be executed. An SMI is generated through a signal to the CPU 142 and causes the processor 142 to save its internal state (registers, tables, etc.) and start execution of the SMI handler routine. As also noted above, when both floppy disk drives 22 and 235 are detected, the host interface 152 (i.e., configuration register FDD_DCD) is programmed by POST to generate an SMI to the processor 142 on accesses to a control register in either diskette controller 226 or 234. The SMI_GEN signal (FIG. 8) is used for the SMI generation.

Conventional non-split systems with two floppy disk drives only have one floppy drive controller. The floppy control register in the single floppy controller is used to select between the first floppy drive and the second floppy drive. Whenever software or BIOS accesses the floppy disk, it first selects the correct drive using the floppy control register.

However, in the split system 10 of the present invention, each of the floppy drives 22, 235 is connected to separate controllers 226, 234 respectively. Accordingly, using the floppy control register on one controller (e.g., 226) would have no effect on the floppy disk connected to the other controller (e.g., 234).

Figure 11:
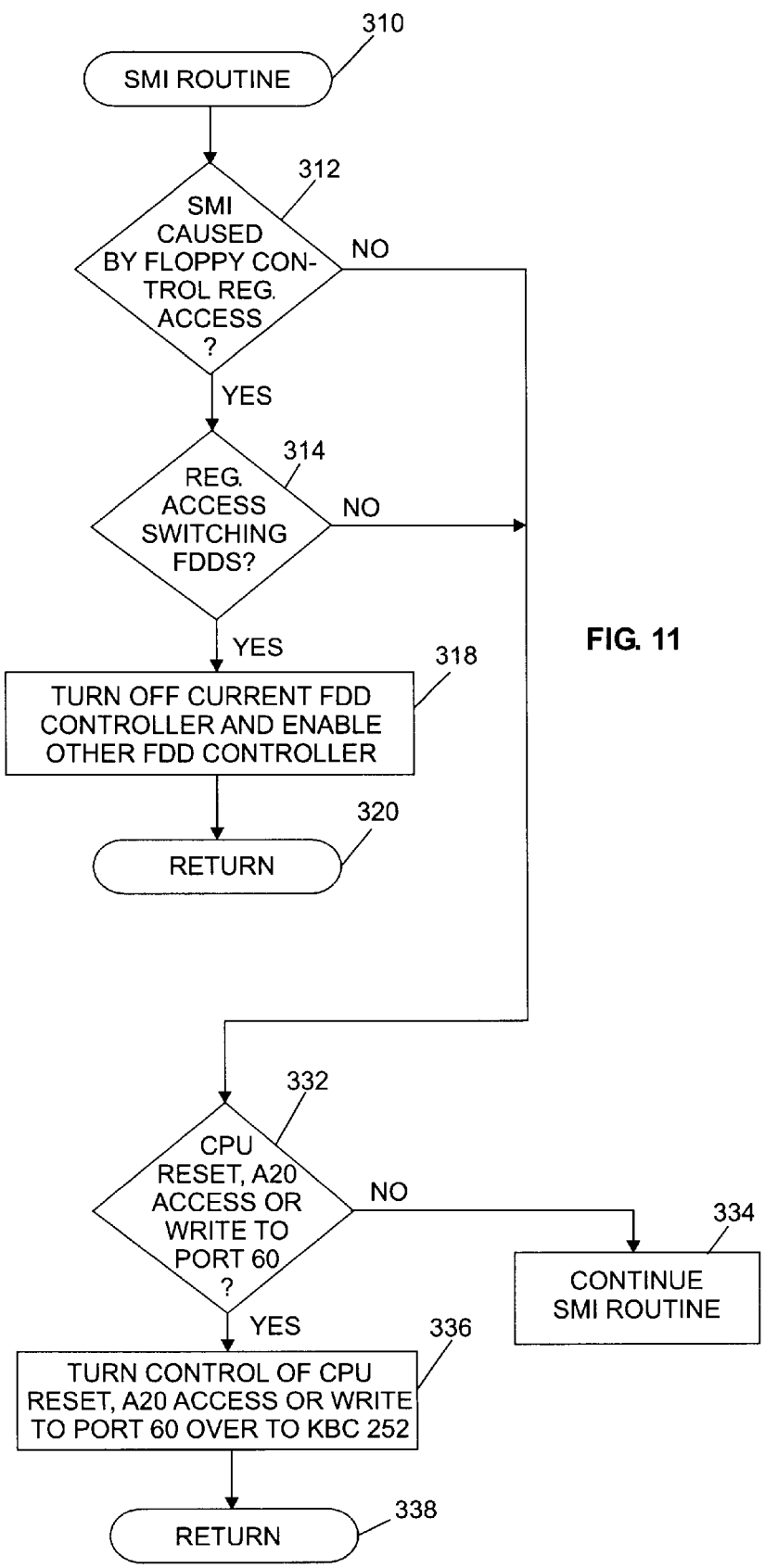
FIG. 11 is a flow chart showing the details of the SMI Handler Routine of the present invention.

In accordance with the present invention, when software or BIOS accesses (e.g., writes) either floppy control register in controller 226 or 234 the host interface 152 (i.e., control circuit 278) generates an SMI to the CPU 142. Thereafter, the CPU 142 executes the SMI interrupt handler, which in the present invention, is the SMI routine shown in FIG. 11.

The SMI routine starts at 310 when the SMI is issued. The routine first checks to see whether the SMI was caused by a floppy control register access at 312. If the SMI was caused by such an access the routine proceeds to check whether the register access is switching floppy disk drives at 314. This is done by the SMI handler looking at CPU registers to determine the value to be written to a floppy control register. The value determines which floppy drive is being selected. If it is determined that either, the SMI was not caused by a floppy control register access at 312 or the register access is not switching floppy disk drives (e.g., the same drive is being selected) at 314 then the SMI routine continues normally at task 332.

If the register access is switching floppy disk drives then the YES branch is taken from decision block 314 to task 318 where the SMI handler turns off the current FDD controller (for example, controller 226) and enables the other FDD controller (for example, controller 234). This is done by accessing the planar SIO chip 255 and the media console SIO chip 286.

First, the SMI handler disables the current FDD controller. If it is the planar FDD controller 234, the planar SIO chip 255 is programmed to deactivate the FDD controller function. If it is the media console FDD controller 226, the SMI handler first enables I/O accesses to the media console SIO chip 286 and then puts it into configuration mode as described above. The SMI handler then deactivates the FDD controller function of the media console SIO chip 286 and exits SIO configuration mode. The handler then unlocks the configuration space of the host interface card 152 as described above, disables decoding of 3Fxh accesses by clearing bit 0 of the FDD_DCD register, disables DACK2 cycles by clearing bits 0 and 1 of the DMA_ACK register, and locks the configuration space of the host interface card 152 back as described above.

Second, the SMI handler enables the other FDD controller. If it is the planar FDD controller 234, the planar SIO chip 255 is programmed to activate the FDD controller function. If it is the media console FDD controller 226, the SMI handler first enables I/O accesses to the media console SIO chip 286 and then puts it into configuration mode as described above. The SMI handler then activates the FDD controller function of the media console SIO chip 286 and exits SIO configuration mode. The SMI handler then unlocks the configuration space of the host interface card 152 as described above, enables decoding of 3FxH accesses by setting bit 0 of the FDD_DCD register, enables DACK2 cycles by setting bits 0 and 1 of the DMA_ACK register, and locks the configuration space of the host interface card 152 back as described above.

Once the other floppy disk controller 234 is set up, the SMI handler exits at 320 returning control to the software or BIOS which was executing when the interrupt occurred. Since the SMI is a hardware event that the operating system and software have no control of, the two floppy disk drives 22 and 235 appear to be two drives that are operating all the time, when in fact only one drive is accessible at any one time.

The SMI is also used for the two keyboard controllers 224 (in the media console 16) and 252 (in the processor unit 18). The keyboard controller 252 in the processor unit 18 is responsible for not only the keyboard 14 and mouse 15 but also the A20 gate, CPU reset and the control of CPU reset. As is well known, the A20 gate is used for access to RAM above 1 MB and the CPU reset is used for rebooting the system 10. When the keyboard and mouse are connected to the media console 16, the A20 gate and CPU reset signals can't reach the CPU 142 and memory controller in the processor unit 18. Thus, there is a need to provide communication between the keyboard controller 252 in the processor unit 18 and the keyboard controller 224 in the media console 16. If the keyboard and mouse are connected to the processor unit 18, no communication is needed.

As a result, the BIOS of the present invention uses the SMI and host interface 152 to reset the CPU 142 and switch the A20 gate on and off, when the keyboard 14 is connected to the media console 16. With the keyboard connected to the media console 16, POST sets bits 0 of the KBM_DCD configuration register to enable port 64H I/O accesses and SMI generation in the host interface 152. The SMI_GEN signal (FIG. 8) is used for the SMI generation.

In accordance with the present invention, when software or BIOS accesses CPU reset, A20 or port 60H the host interface 152 (control circuit 278) generates an SMI to the CPU 142. Thereafter, the CPU 142 executes the SMI interrupt handler, which in the present invention, is the SMI routine shown in FIG. 11.

Referring again to FIG. 11, as noted above, if the SMI handler determined that the SMI was not caused by a floppy control register access at 312 or the register access is not switching floppy disk drives at 314, then the SMI routine proceeds to task 332. The routine checks to see whether the SMI was caused by a request for CPU reset, A20 access or a write to port 60H at 332. If it is determined that the SMI was not caused by such an access at 332 then the SMI routine continues normally at task 334. If the SMI was caused by such an access the routine proceeds to task 336 where the SMI handler turns control of the CPU reset, A20 gate or port 60H write to the keyboard controller 252 in the processor unit 18 which then handles the request. The SMI handler first determines which type of access caused the SMI. If a CPU reset caused the SMI, then the handler writes to the CPU reset register of the keyboard controller 252 in the processor unit 18. If an A20 gate write caused he SMI, then the handler writes to the A20 gate bit of the keyboard controller 252 in the processor unit 18.

Once the keyboard controller 252 has completed the request, the SMI handler exits at 338 returning control to the software or BIOS which was executing when the interrupt occurred. Since the SMI is a hardware event that the operating system and software have no control of, the two keyboard controllers 224 and 252 appear to be one keyboard controller that is operating all the time, when in fact two keyboard controllers are sharing the function of one.

The present invention provides several advantages including automatic configuration of the split system 10 without the user having to intervene. POST and BIOS can detect the presence of the media console 16 and its devices and configure them as if they were part of the planar 140. This also allows existing software and operating systems to use the split system 10 without changes. POST and BIOS configure the system and report the resource configuration based on the devices that are present.

In addition, using the CPU's SMI to control access to split devices allows the user to install more devices in the processor unit 18 to take advantage of the expandability without having to disable or remove any of the devices in the media console 16. The operating system and software see the split devices as one device instead of two, allowing existing software and operating systems to work without changes.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system comprising:

a first housing containing a first direct access storage device (DASD) having an opening for receiving a removable storage medium, a second housing separate from said first housing and containing a processor coupled to a local bus and an expansion bus, a non-volatile storage device coupled to said local bus, a second DASD connected to said local bus and a power supply for supplying power to said system, first and second DASD controllers coupled to said first and second DASD devices respectively, an electrical connector having one end coupled to said first housing and another end coupled to said second housing for electrically connecting devices in said first housing to devices in said second housing, and said second housing having a first interface coupled to said expansion bus and said electrical connector, said first housing having a second interface coupled to said electrical connector and said direct access storage device in said first housing, wherein said system is operative to detect an access to either said first or second DASD controller and disable a current DASD controller and enable said other DASD controller.

2. The computer system of claim 1, further comprising a power on routine which is executed at each power on or reset of said computer system, said power on routine being operative to determine whether said first housing is present, and whether said first and second DASD devices are present and if so, enable said first interface to generate an SMI to said processor upon an access of said first or second DASD device.

3. The computer system of claim 1, wherein said first interface is operative to detect said access to said first or second DASD device and generate an SMI to said processor allowing said processor to transfer control to an SMI routine which disables a current DASD controller and enables said other DASD controller.

4. The computer system of claim 3, wherein said first DASD controller includes a first control register settable in one of an enabled and a disabled state for enabling and disabling said first DASD device, said second DASD controller includes a second control register settable in one of an enabled and a disabled state for enabling/disabling said second DASD device.

5. The computer system of claim 4, wherein said first interface is operative to detect an access of said first or second control register, said SMI routine is operative to determine if said access is switching DASD devices and if so, change one of said first and second control registers from said disabled state to said enabled state and change said other of said control registers from said enabled state to said disabled state.

6. The computer system of claim 1, wherein said first and second DASD devices are floppy disk drives.

7. The computer system of claim 1, wherein a keyboard is coupled to a first keyboard controller within said first housing, said second housing having a second keyboard controller coupled to said expansion bus and wherein said system is operative to detect when a first or second predetermined signal is generated from said keyboard and transfer control over handling such request to the second keyboard controller.

8. The computer system of claim 7, further comprising a power on routine which is executed at each power on or reset of said computer system, said power on routine being operative to determine whether said first housing is present, and whether said keyboard is coupled to said first housing and if so, enable said first interface to generate an SMI to said processor when said keyboard generates said first or second predetermined signal.

9. The computer system of claim 1, wherein said first interface is operative to detect said first or second predetermined signal and generate an SMI to said processor allowing said processor to transfer control to an SMI routine.

10. The computer system of claim 9, wherein said second keyboard controller includes a first register associated with said first predetermined signal and a bit associated with said second predetermined signal.

11. The computer system of claim 10, wherein said SMI routine is operative to (1) determine if said SMI was generated due to the generation of said first or second predetermined signal and (2) if due to the first predetermined signal, writes to said first register of said second keyboard controller, and (3) if due to the second predetermined signal, writes to said bit of said second keyboard controller.

12. The computer system of claim 11, wherein said first predetermined signal is a CPU reset signal, said first register is a CPU reset register and said second predetermined signal is an A20 gate signal.

13. A computer system comprising:
a first housing containing a first direct access storage device (DASD) having an opening for receiving a removable storage medium, and a first keyboard controller,
a keyboard coupled to said first housing and said first keyboard controller,
a second housing separate from said first housing and containing a processor coupled to a local bus and an expansion bus, a non-volatile storage device coupled to said local bus, a power supply for supplying power to said system, a second keyboard controller coupled to said expansion bus,
an electrical connector having one end coupled to said first housing and another end coupled to said second housing for electrically connecting devices in said first housing to devices in said second housing, and
said second housing having a first interface coupled to said expansion bus and said electrical connector, said first housing having a second interface coupled to said electrical connector and said direct access storage device in said first housing, and
wherein said system is operative to detect when a first or second predetermined signal is generated from said keyboard and transfer control over handling such request to the second keyboard controller.

14. The computer system of claim 13, further comprising a power on routine which is executed at each power on or reset of said computer system, said power on routine being operative to determine whether said first housing is present, and whether said keyboard is coupled to said first housing and if so, enable said first interface to generate an SMI to said processor when said keyboard generates said first or second predetermined signal.

15. The computer system of claim 13, wherein said first interface is operative to detect said first or second predetermined signal and generate an SMI to said processor allowing said processor to transfer control to an SMI routine.

16. The computer system of claim 15, wherein said second keyboard controller includes a first register associated with said first predetermined signal and a bit associated with said second predetermined signal.

17. The computer system of claim 16, wherein said SMI routine is operative to (1) determine if said SMI was generated due to the generation of said first or second predetermined signal and (2) if due to the first predetermined signal, writes to said first register of said second keyboard controller, and (3) if due to the second predetermined signal, writes to said bit of said second keyboard controller.

18. The computer system of claim 17, wherein said first predetermined signal is a CPU reset signal, said first register is a CPU reset register and said second predetermined signal is an A20 gate signal.

19. A computer system comprising:
a first housing containing a first direct access storage device (DASD) having an opening for receiving a removable storage medium,
a second housing separate from said first housing and containing a processor coupled to a local bus and an expansion bus, a non-volatile storage device coupled to said local bus, a second DASD connected to said local bus and a power supply for supplying power to said system,
first and second DASD controllers coupled to said first and second DASD devices respectively,
an electrical connector having one end coupled to said first housing and another end coupled to said second housing for electrically connecting devices in said first housing to devices in said second housing, and
said second housing having a first interface coupled to said expansion bus and said electrical connector, said first housing having a second interface coupled to said electrical connector and said direct access storage device in said first housing, first means in communication with said non-volatile memory for performing a DASD switch routine in response to an access to either said first or second DASD.

20. The computer of claim 19, wherein said means comprises a power on routine which is executed at each power on or reset of said computer system, said power on routine being operative to determine whether said first housing is present, and whether said first and second DASD devices are present and if so, enable said first interface to generate an SMI to said processor upon an access of said first or second DASD device.

21. The computer system of claim 20, wherein said DASD switch routine is an SMI routine executed by said processor after said first interface generates an SMI to said processor.

22. A method for selecting between first and second direct access storage devices (DASDs) in a split system computer system, said computer system comprising: a first housing containing said first DASD, a second housing separate from said first housing and containing a processor coupled to a local bus and an expansion bus, a non-volatile storage device coupled to said local bus, a second DASD connected to said local bus, first and second DASD controllers coupled to said first and second DASD devices respectively, an electrical connector for electrically connecting devices in said first housing to devices in said second housing, and said second housing having a first interface coupled to said expansion bus and said electrical connector, said first housing having a second interface coupled to said electrical connector and said first DASD device, said method comprising the steps of:

detecting an access to either said first or second DASD device, and disabling a current DASD controller and enabling said other DASD controller.

23. The method of claim 22, further including the steps of:

determining whether said first housing is present, determining whether said first and second DASD devices are present only in response to a determination that said first housing is present, enabling said first interface to generate an SMI to said processor upon an access of said first or second DASD device only if it was determined that said first and second DASD devices are present.

24. The method of claim 22, further including the steps of:

generating an SMI to said processor when said first interface detects said access to said first or second DASD device, and performing an SMI routine which disables a current DASD controller and enables said other DASD controller.

25. The method of claim 24, wherein said first DASD controller includes a first control register settable in one of an enabled and a disabled state for enabling and disabling said first DASD device, said second DASD controller includes a second control register settable in one of an enabled and a disabled state for enabling/disabling said second DASD device.

26. The method of claim 25, wherein said detecting step includes detecting an access of said first or second control register, said SMI routine includes the steps of:

determining if said control register access is to switch DASD devices, changing one of said first and second control registers from said disabled state to said enabled state and changing said other of said control registers from said enabled state to said disabled state only if it was determined that said control register access was to switch DASD devices.

* * * * *